(12) United States Patent
Aldinger et al.

(10) Patent No.: US 6,489,017 B1
(45) Date of Patent: Dec. 3, 2002

(54) MOLDING METHOD FOR CERAMICS AND METALS IN AQUEOUS SYSTEMS BY MEANS OF TEMPERATURE VARIATION

(75) Inventors: Fritz Aldinger, Leinfelden-Echterdingen (DE); Wolfgang Sigmund, Gainesville, FL (US); Joseph Yanez, North Huntingdon, PA (US)

(73) Assignee: Max-Planck-Gesellschaft zur Fulderung der Wissenschaften E.V., Munich (DE)

( * ) Notice: Subject to any disclaimer, the term of this patent is extended or adjusted under 35 U.S.C. 154(b) by 0 days.

(21) Appl. No.: 09/445,433
(22) PCT Filed: Jun. 12, 1998
(86) PCT No.: PCT/EP98/03555
§ 371 (c)(1), (2), (4) Date: Apr. 6, 2000
(87) PCT Pub. No.: WO98/56733
PCT Pub. Date: Dec. 17, 1998

(30) Foreign Application Priority Data

Jun. 12, 1997 (DE) .......................................... 197 24 922
Sep. 5, 1997 (DE) .......................................... 197 38 910
Nov. 21, 1997 (DE) .......................................... 197 51 696

(51) Int. Cl.[7] .............................................. B32B 5/16
(52) U.S. Cl. ...................... 428/323; 428/332; 428/357; 428/402; 428/403; 29/527.5; 264/301; 264/636; 264/637; 264/651; 264/669; 264/670
(58) Field of Search ................................. 264/636, 637, 264/651, 301, 669, 670; 29/327.5; 428/323, 332, 357, 402, 403

(56) References Cited

U.S. PATENT DOCUMENTS 6,187,256 B1 * 2/2001 Aslan et al. ................. 264/666

FOREIGN PATENT DOCUMENTS

| EP | 0 260 577 | 3/1988 |
| EP | 0 650 945 | 3/1995 |
| WO | WO-97/13734 | * 4/1997 |

OTHER PUBLICATIONS

K. R. Venkatachari et al., "Dispersion of silicon nitride powders in aqueous media wit coupling agents", Ceram. Trans., vol. 19, 1991, pp. 75–82.

* cited by examiner

Primary Examiner—Blaine Copenheaver
Assistant Examiner—Christopher Paulraj
(74) Attorney, Agent, or Firm—Arent Fox Kinter Plotkin & Kahn, PLLC

(57) ABSTRACT

The invention relates to a method for producing a solid molded article, in particular a ceramic and/or metallic article made of pulverized particles. The invention also relates to stable dispersions of pulverized particles in an aqueous fluid medium, solid molded articles made of pulverized particles, and sintered ceramic and/or metallic molded articles.

33 Claims, 6 Drawing Sheets

MOLDING METHOD FOR CERAMICS AND METALS IN AQUEOUS SYSTEMS BY MEANS OF TEMPERATURE VARIATION

The invention relates to a method for producing a solid molded article, in particular a ceramic and/or metallic article made of pulverized particles. The invention also relates to stable dispersions of pulverized particles in an aqueous fluid medium, solid molded articles made of pulverized particles, and sintered ceramic and/or metallic molded articles.

High-tech ceramics exhibit a combination of exceptional qualities, which are not attained in this form by any other class of materials. Two of the main reasons why there has not been a breakthrough in the manufacturing and use of such ceramics so far have been the lack of cost-efficient manufacturing methods and the fact that mass-produced components have proved unreliable (Aldinger, Technische Keramik- eine Herausforderung, Keramik-zeitschrift 40 (1988), 312). The failure probability of ceramic components depends on the defect population in the material (Evans and Wiederhorn, Crack Propagation and Failure Prediction in $Si_3N_4$ at Elevated Temperatures, J. Mat. Sci. 9 (1974), 270–278). Most defects are introduced into the component during processing and during manufacture of the component (Lange, "Powder Processing Science and Technology of Increased Reliability", J. Am. Ceram. Soc. 72 (1989), 3–15).

In most of the standard processes used in industrial-scale ceramics manufacturing, the introduction of large defects is intrinsic and thus unavoidable. For example, the use of spray drying for the production of pourable granulated powder for dry press molding results in the formation of agglomerate relicts, which constitute the basis for very large defects in the resulting ceramic components. At the same time, the variables in the production process lead to differing defect populations and thus to varying statistical characteristics.

In order to avoid these defects, one can resort to a technique referred to as "colloidal processing" (cf. Lange (1989), supra). This colloidal processing technique involves the following steps: production of a liquid dispersion of ceramic particles in a medium, filtration to remove impurities, addition of a precipitant in order to obtain a solid product, and subsequent molding.

Specific examples of such processes are the Direct Coagulation Casting (DCC) process, the HAS process and the Vibraforming process. The basic idea behind all of these processes is that, in order to achieve solidification in an aqueous system, the surface charge of powder particles is altered by means of a chemical reaction, or else salt or other compounds have to be added to the system.

In the DCC process (cf. eg, Graule et al., DKG 71 (1994), 317–322; Graule et al., Chemtech 25 (1995), 31–37; Graule et al., Industrial Ceramics 16 (1996), 31–34 and Baader et al., Industrial Ceramics 16 (1996), 36–40), the surface charge of powder particles is increased strongly by addition of citric acid, so that a dispersion with a high volume content of powder particles can be produced. The dispersion also contains urea or modified urea, which is broken down to $NH_3$ and $CO_2$ by addition of the enzyme urease. This leads to a rise in pH of the dispersion, and initiates the solidification process. A disadvantage of this process, however, is that the solidification is not reversible. If the dispersion is not poured into the mold quickly enough, the entire slurry has to be disposed of. The same applies to the green body should it become damaged. An added disadvantage is that the green body is very brittle. The DCC process has, moreover, so far been limited to $Al_2O_3$ ceramics, being poorly suited, in particular, for nitridic ceramics or mixtures of ceramics.

In the HAS process (see patent application S195 000 73), aluminum nitride is used as additive, and is converted during solidification into aluminum oxide. The process can therefore only be used for ceramics which contain aluminum oxide. With the HAS process, too, fragile molded articles of low mechanical strength are obtained, which cannot be redispersed.

The Vibraforming process (Lange, supra) involves adjusting the forces acting between the powder particles by means of adding salts and other substances, so that the molding compound is almost solid at room temperature and only liquefies—on account of shear forces—when subjected to vibration. The compound is then introduced under pressure into a mold. Disadvantages here are the high salt content and the fact that the molding compound is relatively difficult to handle. The high salt content, eg, $NH_4Cl$, causes the release of toxic gases such as HCl and ammonia during burnout, or the presence of undesirable compounds such as metal chlorides in the grain boundary phase of the resulting ceramic. In addition, to achieve complete solidification, the pH of the suspension is altered by means of breaking down urea. Here too, fragile molded articles of low mechanical strength are obtained, which cannot be redispersed.

In another coagulation process, that of Bergstrom (U.S. Pat. No. 5,340,532), organic solvents are used and it is necessary to lower the temperature in order to consolidate the ceramic.

The WO84/02519 describes a method of producing silicon dioxide glass, in which colloidal silicon dioxide is added to a hydrolyzed metal oxide sol, the sol containing the colloidal silicon dioxide gels and is dried to a dry gel, and the dry gel is sintered to form silicon dioxide glass. The solidification of a dispersion of pulverized particles by means of a temperature increase is not disclosed.

The DE-A41 31 335 describes a method of producing ceramic articles, in which a dispersion of pulverized ceramic material is prepared and cast in shape. The raw material is dispersed in a curable organic compound, in particular a synthetic resin, to form a relatively thin dispersion. The dispersion is poured into the mold and allowed to cure prior to demolding. The demolded green body is annealed in an inert gas atmosphere, and the organic compound broken down by way of cracking into volatile components and maybe residual components. The solidification of an aqueous dispersion by means of a temperature increase is not disclosed.

The EP-A-0 260 577 describes a water-soluble polymer for the dispersion of a powder. The solidification of a dispersion of pulverized particles by means of a temperature increase is not disclosed.

The DE-A43 36 694 discloses a method of producing sintered metallic and ceramic articles and layers, in which nanocrystalline ceramic or metallic powder is dispersed—in the presence of at least one low-molecular organic compound with at least one functional group which can react and/or interact with groups present at the surface of the powder particles—in water and/or a polar organic solvent serving as dispersing medium, the dispersing medium is removed and the surface-modified ceramic or metallic powder, having been processed—either before or after removal of the dispersing medium—eg, by means of freeze drying or freeze spray drying, to green bodies or layers, is sintered. Solidification of the dispersion by means of heating is not disclosed.

The DE-A-44 17 405 describes a method of producing textured organic layers on substrates, in which a composition obtained by means of hydrolysis and polycondensation of at least one hydrolyzable silane, at least one organosilane and maybe one or more compounds of glass- or ceramic-forming elements, is applied to a substrate, the applied composition is textured and the textured coating is densified thermally to a textured layer. The production of molded articles by means of increasing the temperature and thus causing a dispersion of pulverized particles to solidify is not disclosed.

The DE-A-195 40 623 describes a method of producing composite materials with a high interfacial fraction, in which a nanoscale filler is dispersed in a polymeric matrix. The filler particles, which may be surface-modified and which have an affinity for the matrix phase and a particle size of not more than 200 nm, are incorporated in the matrix phase in such a way that they are dispersed in an essentially agglomerate-free state therein. The production of molded articles by means of increasing the temperature and thus causing a dispersion of pulverized particles to solidify is not disclosed.

The problem on which this invention is based was thus to provide a method with which the disadvantages of the prior art are at least partially overcome and which, in particular, allows simple and efficient colloidal processing in an aqueous medium.

This problem is solved by means of a method for producing a solid molded article made of pulverized particles and comprising the steps:

(a) preparation of a dispersion of pulverized particles in an aqueous fluid medium, the particles exhibiting a temperature-dependent charge state;

(b) if necessary filtering the dispersion to remove impurities;

(c) transferring the dispersion to a mold;

(d) supplying heat to solidify the molding compound in the mold;

(e) maybe demolding the solidified body and (f) maybe drying the body.

The principle on which the method of the invention is based is that a dispersion of pulverized particles exhibiting a temperature-dependent charge state is prepared in an aqueous medium. By raising the temperature, it is possible to lower the charge on the particles in the dispersion, resulting in temperature-controlled solidification. Until now it was assumed that the amount of charge on the particles was only slightly temperature dependent (Intermolecular & Surface Forces, Jacob lsraelachvili, Second Edition, Academic press, Harcourt Brace & Company, Publishers, Page 176–193). It was thus surprising that with the method of the invention, it is possible, by controlling the temperature increase, to influence the amount of charge on the particles in such a manner as to allow control over the solidification process.

In a preferred embodiment, the method is characterized in that, in step (a), the pulverized particles are coated with a dispersant.

This involves preparing a dispersion of pulverized particles in an aqueous medium to which a dispersant is added. The dispersant exhibits temperature-dependent solubility properties, and attaches itself to the dispersed particles. Any molecule may be used as dispersant, eg, any organic or inorganic compound or ion, which is able to attach itself to the dispersed particles. It is preferable to use a dispersant with which a short-range repulsive potential is established at the surface.

A short-range repulsive potential is achieved by means of mechanically blocking the space at the surface of the particle. As result, the surfaces of the particles are no longer able to touch each other, being kept a very small distance apart which corresponds to the size of the molecule. This means that the absolute maximum of the attractive forces acting between the particles, being strongly dependent on the distance the particles are apart, is avoided. Reduced attractive forces of this kind, resulting from mechanical spacers, are described as a short-range repulsive potential.

The effect of limiting the maximum attractive force by means of spacers is that the particles begin to flow against each other before, under the influence of a mechanical force, they break inelastically into many fragments. Thus one can also refer to them as lubricating forces.

The dispersant is 0.2 nm to 10 nm in size. It is especially preferable if the dispersant contains an anchoring group for attachment to the particle surface, and a stabilizing group to effect stabilization in water at the temperature used for dispersion. The dispersant may exhibit one or more anchoring groups for attachment to the particle surface, the attachment being, for example, in the form of a chemical bond and/or in the form of physical adsorption. In the case of a chemical bond, the presence of a single anchoring group is sufficient, whereas for physical adsorption, it is preferable to have several anchoring groups. The stabilizing group is preferably a hydrophilic organic chain which behaves like a concertina. At low temperatures, eg, room temperature, a chain of this kind is extended; as the temperature rises, it contracts. A controlled approach of powder particles with a dispersant attached to their surfaces is allowed when there is a gentle rise in temperature. In this way, the approach of the particles towards each other, and thus the solidification process, is controlled synergistically as a function of temperature by means of the charge on the particles and the steric properties of the stabilizing group. This leads to a controlled increase in the attractive forces (van der Waal's forces) and to homogeneous and rapid solidification of the dispersion.

Attachment of the dispersant to the powder particles can be effected by adding the dispersant to a dispersion of the pulverized particles in an aqueous medium. Alternatively, the dispersant can also be attached to the surface of the powder particles under non-aqueous conditions. This procedure is preferred in particular for particles which are sensitive to moisture and/or oxygen, such as nitridic ceramic particles. The method of the invention thus allows the pulverized particles to be coated in a process separate from the molding process, if so desired. The particles can be coated, for example, by the powder manufacturer, who then supplies the coated particles to the manufacturer of the molded article. On the other hand, it is of course possible to carry out the coating and molding processes in a single operation.

The method of the invention makes it possible to work in an environmentally friendly aqueous medium, i.e. in a medium containing at least 50 wt. % water. It is to advantage if the medium contains at least 70 wt. % water, or, best of all, if it consists essentially of water. The use of aqueous media makes it easier to disperse the pulverized particles; it is beneficial if dispersion is promoted by the influence of shear forces, for example, by means of grinding, eg, in a ball mill. In aqueous media, much shorter grinding times suffice (10% of the time needed for organic media), more energy is introduced than into organic solvents, and less oxygen, which can be of importance, eg, for nitridic and carbidic ceramic powders.

The method of the invention, which comprises the solidification of a powder compound by means of a temperature increase in an aqueous medium and involves the use of suitable dispersants, is universally applicable for any kind of pulverized particles desired, e.g. for ceramics, paints, metals, pharmaceutical substances, and pigments. It is to advantage, however, to select the pulverized particles from inorganic particles such as ceramic and/or metallic particles. The greatest preference is given to ceramic particles. All kinds of carbidic, nitridic and oxidic materials, e.g. hard materials, metal oxides, or ceramics based on $Si_3N_4$, $Al_2O_3$, $TiO_2$, SiC or $ZrO_2$, or also mixtures of different kinds of particles, can be processed.

It is of advantage to use particles which, with increasing temperature, show an increase in the solubility of materials out of the particles, eg, metal ions. This increase in solubility raises the salt content of the dispersion, and contributes to solidification by means of coagulation.

It is an additional advantage if the increase in solubility of materials out of the particles alters the system's pH. This also promotes consolidation. A pH change in the direction of the powder particles' isoelectric point is especially beneficial.

In general, only very small quantities of dispersant need be added to the pulverized particles, for example, enough to coat the surface of the pulverized particles with just a monolayer of dispersant. It is beneficial if the dispersant is added in a proportion of 0.0001 to 5 wt. %, expressed in terms of the weight of pulverized particles. It is particularly beneficial if the dispersant is added in a proportion from 0.001 to 2.5 wt. %, or, best of all, 0.01 to 1.5 wt. %.

One effect of the dispersant is that it serves as a spacer, and prevents the dispersion from flocculating at low temperatures due to direct contact between the particles. It can also serve to adjust the isoelectric point of the dispersion, thus further promoting solidification. For example, by varying the amount of citric acid or citric acid salts added as dispersant to aluminum oxide particles in water, it is possible to adjust the isoelectric point of an aluminum oxide dispersion to any desired value between pH 9 (no citric acid) and pH 3.

In another preferred embodiment, the method of the invention is conducted in the presence of one or more inorganic adhesion promoters. These are dissolved inorganic substances which are present in the particle dispersion and which, during solidification and/or drying of the dispersion, are preferably precipitated at the points of contact between the particles. By means of this localized precipitation, a maximum increase in the strength of the green body is achieved with a minimum quantity of inorganic adhesion promoter. It is of advantage to use an inorganic adhesion promoter the solubility of which is temperature and/or pressure dependent.

A preferred inorganic adhesion promoter, especially for ceramic powders containing silicon, is $SiO_2$, which dissolves in an aqueous medium from the surface of the ceramic particles and—as already described—is precipitated again during subsequent solidification and/or drying. A temperature rise, as provided for in the invention, particularly promotes the dissolution of $SiO_2$. On account of the subsequent reprecipitation, the green strength of the ceramic article is automatically increased.

The concentration of dissolved inorganic adhesion promoters in the dispersion can be further increased by additional measures. The dissolved $SiO_2$ content, by way of example, can be increased by leaching of the ceramic powder, eg, by adjusting to an acidic pH. In addition, and/or as an alternative, soluble $SiO_2$ may be added.

For ceramic powders with no soluble surface silicon, or in cases where no $SiO_2$ content is allowed, other soluble inorganic compounds can be selected as adhesion promoters, e.g. aluminum hydroxide, yttrium hydroxide, or similar compounds.

Should the addition of soluble compounds lead to problems with the powder preparation, the adhesion promoters can be packaged in microcapsules. These capsules are designed such that they can be destroyed, and the inorganic adhesion promoter released, when the molding compound is heated, and/or during drying.

It is expedient to use the inorganic adhesion promoter in a proportion of 0.00001 wt. % to 5 wt. %, expressed in terms of the ceramic powder. It is even better to use 0.0001 wt. % to 1 wt. %, and best of all to use between 0.005 wt. % and 0.1 wt. %.

According to a preferred embodiment, one uses pulverized anisotropic particles in step (a). Pulverized ceramic particles, for example, especially such particles with surfaces which, on account of the crystalline character, are anisotropic, exhibit anisotropic force-distance curves. It was surprising to find that by adjusting the temperature suitably, the forces between the different surfaces of pulverized particles can be adjusted such that the particles can be oriented crystallographically. In this way, it is possible to obtain large, highly ordered, crystallographically oriented areas, which can be transformed after sintering into selectively strongly textured polycrystalline materials, highly ordered polycrystalline materials or even single crystals. The method of the invention thus provides a simple means for the cost-efficient production of crystallographically oriented materials of complex shape, and also of single crystals. By means of simple experiments, persons versed in the art will be able to determine the combination of suitable pulverized particles and dispersants, and also the processing temperature required to effect the crystallographic alignment of the particles.

There is, moreover, no need to add a binder, since with the method of the invention, an elastic, water-containing molded article is obtained after solidification, from which, if necessary after drying, an easy-to-handle, brittle green body results.

Certain embodiments of the invention provide for the possible addition of water-soluble polymers to the dispersion. It is expedient to add them in a proportion of 0.01 to 10 wt. % or, better still, in a proportion from 0.01 to 5 wt. %, expressed in terms of the weight of the dispersion. Examples of suitable water-soluble polymers are polyvinyl alcohol, starch, modified starch, polyethylene oxide, polyvinyl pyrrolidone, polyoxymethylene, organosilicon polymers such as siloxanes, or mixtures thereof. When water-soluble polymers of this kind are used, subsequent sintering of the molded article must be preceded by burn-out.

It is to advantage if the pulverized particles in the dispersion have an average diameter of <5 $\mu$m, or better still, of <2 $\mu$m. Particles of this size are obtained either by using starting materials which fulfil this size requirement, and/or by means of additional grinding, eg, with a ball mill, during dispersion.

The method of the invention expediently includes a filtration step to remove impurities. Filtration is best carried out at a temperature at which the dispersion is of low viscosity. For the filtration, fine filters are used which remove impurities >5 $\mu$m, better still >2 $\mu$m. This makes it possible, in the case of ceramics, to achieve an increase in Weibull's modulus after sintering.

The dispersant used in the method of the invention preferably has the general formula (I):

$$A—R \qquad (I)$$

where
- A stands for one or more anchoring groups which are capable, eg, by means of a chemical bond and/or physical adsorption, of attaching to the surface of particles, eg, of ceramic and/or metallic particles, and
- R stands for one or more stabilizing groups characterized by temperature-dependent solubility—which preferably decreases with increasing temperature—in an aqueous medium.

A is preferably a group selected from —OH, —I, —SO$_3$H, —PO$_3$H$_2$, aldehyde, tosylate, epoxide, and a silicon-containing group. It is to advantage if A is a silicon-containing group, eg, a silane group. An example of a suitable dispersant with a silicon-containing anchoring group is a compound with the general formula (II):

$$SiXYZ—R \qquad (II)$$

where
- R has already been defined, and
- X,Y and Z are substituents on Si, which are preferably selected independently from H, halogen, especially Cl or Br, OH, OR$^1$ and R$^1$, where R$^1$ is an alkyl, alkenyl or alkinyl radical which may be substituted (for example, by halogen or heteroatoms such as groups containing O, N or S), the alkyl, alkenyl or alkinyl radical preferably having 1 to 10 or, better still, 1 to 6 C atoms. At least one of the substituents on Si must be different from R$^1$.

Higher homologues of compounds with the formula (II) are also suitable, ie, dimers, trimers or oligomers which contain Si atoms linked via -O- bridges and which can be linear or branched. Examples here are compounds of the general formula (III):

$$R—Si(XY)—O—Si(R)(XY) \qquad (III)$$

where
- R,X and Y are defined as before.

It is, of course, also possible to use silicon-free anchoring groups, provided they adhere sufficiently well to the pulverized particles under the conditions prevailing during dispersion. Examples of such compounds include R—CH$_2$—OH, R—CH$_2$-tosylate, R—CH$_2$—I and epoxides, and here too, the compounds can be monomeric or oligomeric.

The stabilizing group R is preferably a group comprising at least two C$_2$-C$_4$ alkylene oxide units. It is particularly expedient if the stabilizing group is a chain built up from ethylene oxide units, propylene oxide units, or mixtures thereof, and comprising at least two units. The stabilizing group R can, in addition, contain one or more groups which may be protonated and/or deprotonated, ie, Brönsted acid and/or Brönsted base groups. Examples of such acid and/or base groups are —NR$^2$—, —NR$^2$—CO—, —N(R$^2$)$_2$, —CO—N(R$^2$)$_2$— and COOR$^3$ groups, where R$^2$ stands for H or an alkyl, alkenyl or alkinyl radical (as defined above), which may be substituted, and R$^3$ stands for H or a metal or ammonium cation.

Step (c) of the method of the invention comprises transferring the dispersion to a mold. This can be done in any familiar manner, eg, by means of pouring. The dispersion can be cast as a preform—eg, an ingot, a slab or a billet—which is suitable for further forming. Alternatively, the dispersion can be cast in molds of a given and maybe complex shape, in which case little or no finishing is required. A special advantage of the method of the invention is that for casting—in contrast to the hitherto customary slip casting—a non-porous mold can be used, since consolidation does not necessitate withdrawing water through a porous wall. This means that no inhomogeneities occur due to body formation, as is common with slip casting. Techniques which are facilitated by the method of the invention include, for example, constructive film casting. It is always possible to cast and then to print by means of the screen printing process. The techniques used in a potter's workshop, as well as the entire range of shaping methods used to manufacture conventional ceramics (washbasins, plates, etc.) can be used, since at temperatures above room temperature, the damp molding compound can be processed plastically. Techniques such as extrusion and injection molding can also be used.

Step (d) of the method of the invention comprises heating to effect solidification of the molding compound in the mold. It is beneficial if heating is conducted such that the viscosity of the dispersion is increased by a factor of at least 10$^3$, or, better still, by a factor of 10$^4$. The heating step can comprise increasing the temperature by 20 to 95° C., preferably by 20 to 70° C., eg, from room temperature (25° C.) to 50 to 95° C. The dispersion solidifies as a result of the heating process, and a water-containing, mechanically stable elastic molding is obtained, which can be removed from the mold right away. It is not necessary to first remove the water.

The molding can then be dried, if necessary, and sintered. Drying may be effected simply and quickly using familiar methods, eg, in an oven. Sintering can be conducted without prior burnout, since only small amounts of dispersant need to be used (eg, 0.4 wt. %).

Additional subject matter of this invention is a dispersion of pulverized particles—preferably particles with a mean diameter <2 μm—in an aqueous fluid medium, said dispersion containing 0.0001 to 5 wt. % dispersant, expressed in terms of the weight of pulverized particles, which is attached to the surface of the particles and exhibits temperature-dependent solubility properties. The addition of dispersant renders the dispersion of the invention stable over a protracted period of time, both in respect of sedimentation and of chemical changes such as oxidation. The molding compound can be redispersed even after drying. The dispersion of the invention can, in addition, contain at least one inorganic adhesion promoter.

Further subject matter of the invention is a solid green molded article made of pulverized particles, obtained by means of a method of the type described above and consisting of particles to the surface of which a dispersant is attached, the dispersant exhibiting temperature-dependent solubility properties in an aqueous medium. Further subject matter again is a solid green molded article of pulverized particles, obtained by means of a method of the type described above and having crystallographically oriented, anisotropic polycrystalline areas. In a molded article according to the invention, therefore, the choice of temperature not only serves to establish the packing characteristics in green condition but, in addition, the crystallographic orientation of the particles and a defined texture in the molded article. It is especially beneficial if the molded article has an essentially anisotropic texture. The proportion of dispersant relative to the powder particles is preferably 0.0001 to 2.5 wt. %, or, better still, 0.001 to 1.5 wt. %. It is furthermore to advantage if the molded article has a density of 40 to 70 vol. %, expressed in terms of the theoretically achievable density.

The molded article of the invention is essentially free of density gradients and is redispersible. Another advantage is that it is essentially free of salts such as $NH_4Cl$, containing less than 1 wt. % or, in particular, less than 0.5 wt. % thereof.

A sintered ceramic and/or metallic molded article, obtained by the method of the invention with subsequent sintering, is also subject matter of the invention. Additional subject matter is a highly ordered, crystallographically oriented, anisotropic polycrystalline molded article obtained by the method of the invention with subsequent sintering. The article can also be very thin, so that it is possible, also for ceramic films, to lay down the desired crystallographic orientation, and not only to obtain textural effects in the direction of pouring, as was the case until now. The final subject matter of the invention is a single-crystal molded article, obtained by the method of the invention with subsequent sintering. The sintered article of the invention is more homogeneous than a sintered article made by means of slip casting with subsequent sintering. Moreover, the sintered article of the invention contains fewer residues of undesirable substances than does a sintered article according to the prior art and made by means of preceding coagulation processes. This is because, apart from the dispersant, only very small quantities of which are required, no additional substances must be added to the dispersion that could lead to combustion residues.

With the method of the invention, it is possible to produce polycrystalline materials of defined texture and complex single-crystal shapes, for which, until now, complicated and expensive processes were needed. Textured polycrystalline systems or single crystals as claimed in the invention can be used, for example, as superconductors, ionic conductors or electronic conductors, eg, fuel cells or electric cables.

The invention is now explained by means of the following examples and the drawings.

EXAMPLE 1

The experiments described below were performed on $Si_3N_4$ ceramic powder and a polyethyleneoxide-silane dispersant (N-triethoxysilylpropyl)-O-polyethyleneoxiduret (commercially available from ABCR in Karlsruhe, Germany, under the catalogue number SIT 8192.0). Corresponding results were obtained with an N-2 (aminoethyl-3-aminopropyl)-trimethoxy-silane dispersant.

Rheology

The flow properties of a molding compound comprising 20 vol. % $Si_3N_4$ powder and 1.5 wt. % PEO silane were investigated. The rheology curve clearly shows the dependence of the flow properties on temperature. When the temperature was raised from 25° C. to 60° C., the viscosity rose by 5 orders of magnitude. When the amount of powder was increased (>20 vol. %), the compound solidified at 60° C.

Figure 1:
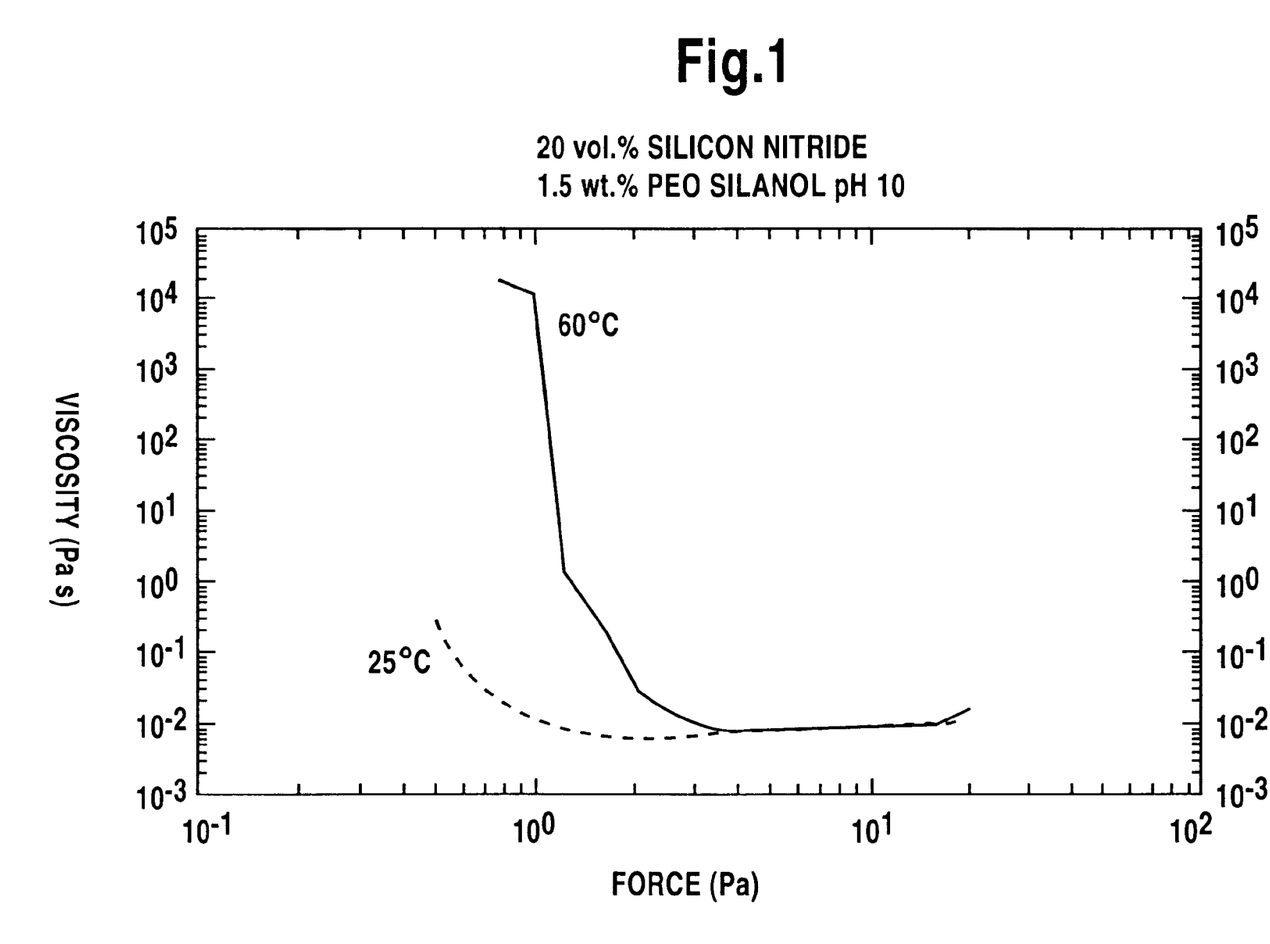
FIG. 1 shows the results of rheology measurements on a dispersant-coated $Si_3N_4$ dispersion, as a function of temperature.

The study was conducted with a Constant Stress Rheometer SR500 from the company Rheometrics. The measuring geometry is referred to as a conical cylinder. The results of the rheology measurements are shown in FIG. 1.

Attachment of the Dispersant to the Surface of the Particles

Proof of the attachment of the dispersant to the surface of the particles was obtained by means of DRIFT (diffuse reflection infrared spectroscopy). Despite repeated intensive washing, the dispersant could not be removed from the powder surface.

Figure 2:
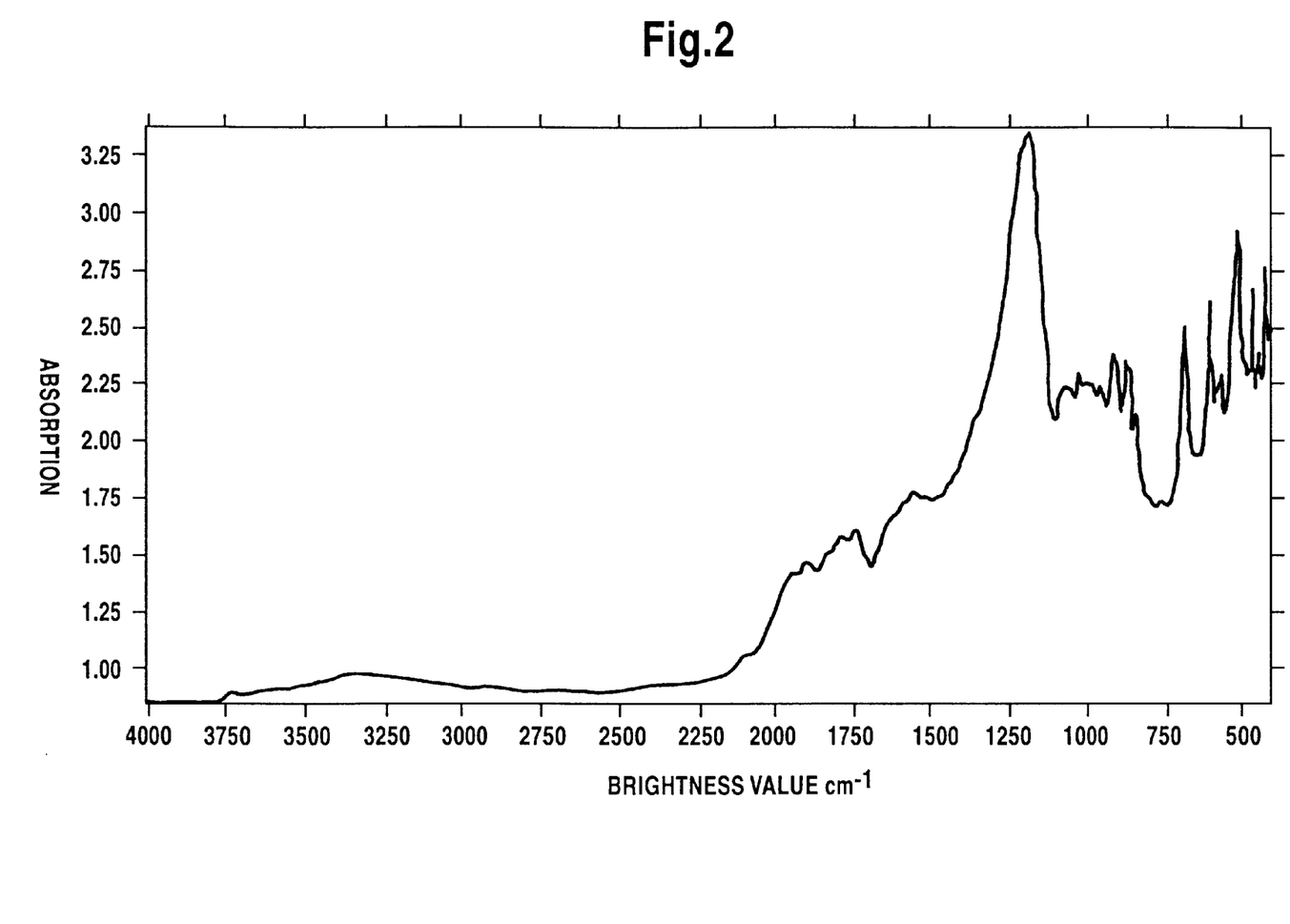
FIG. 2 shows an infrared spectrum of $Si_3N_4$ powder.
Figure 3:
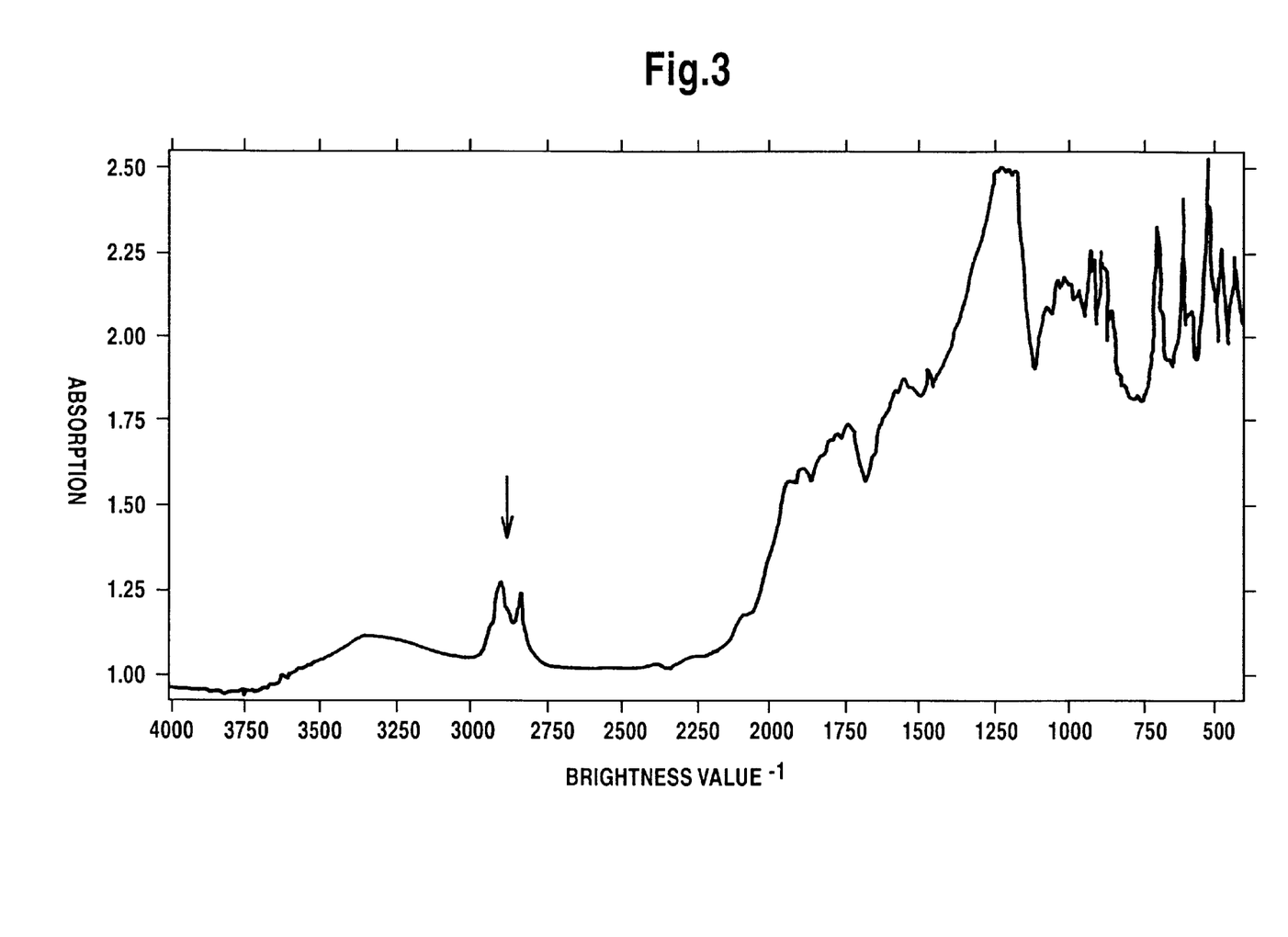
FIG. 3 shows an infrared spectrum of a dispersant-coated $Si_3N_4$ powder.

FIG. 2 shows the DRIFT spectrum of pure $Si_3N_4$ powder. FIG. 3 shows the spectrum of powder coated with PEO silane. Here, in the region from 2800 to 3000 $cm^{-1}$, there are additional peaks due to the presence of silane.

Measurement of the Zeta Potential

Figure 4:
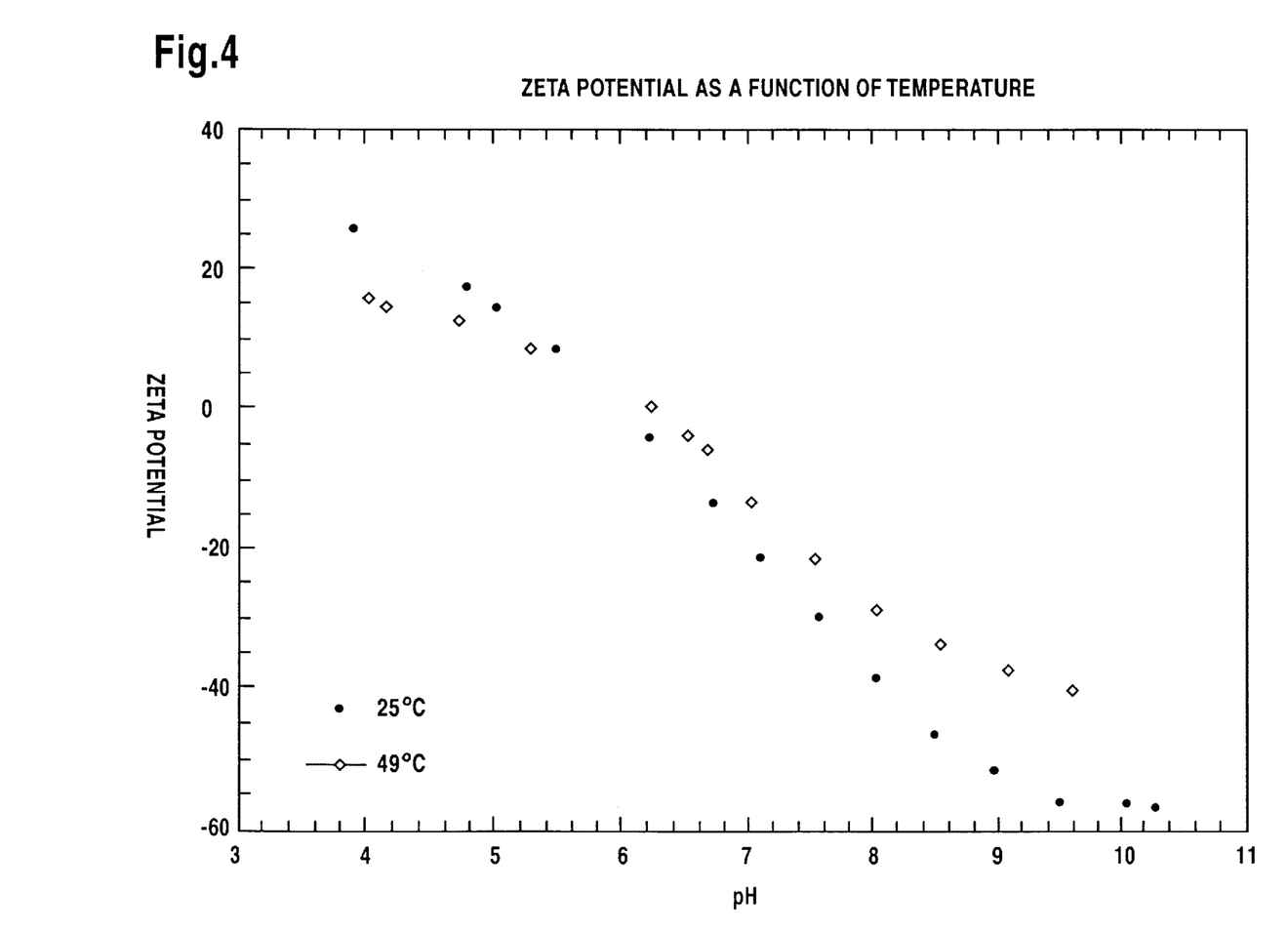
FIG. 4 shows the charge (zeta potential) on $Si_3N_4$ powder as a function of pH at 25° C. and 49° C.

The zeta potential of $Si_3N_4$ powder was measured as a function of pH at 25° C. and 49° C. It is clearly evident that a rise in temperature from 25° C. to 49° C. causes the zeta potential at pH 9.5 to drop from −57 mV to −40 mV. If the temperature is increased further, the charge and thus the zeta potential continues to drop. The reduction in zeta potential leads to a decrease in repulsive forces and to the development of attractive forces. The force-distance curves (cf. FIG. 5) show this clearly.

Measurement of the Force-distance Curves

Figure 5:
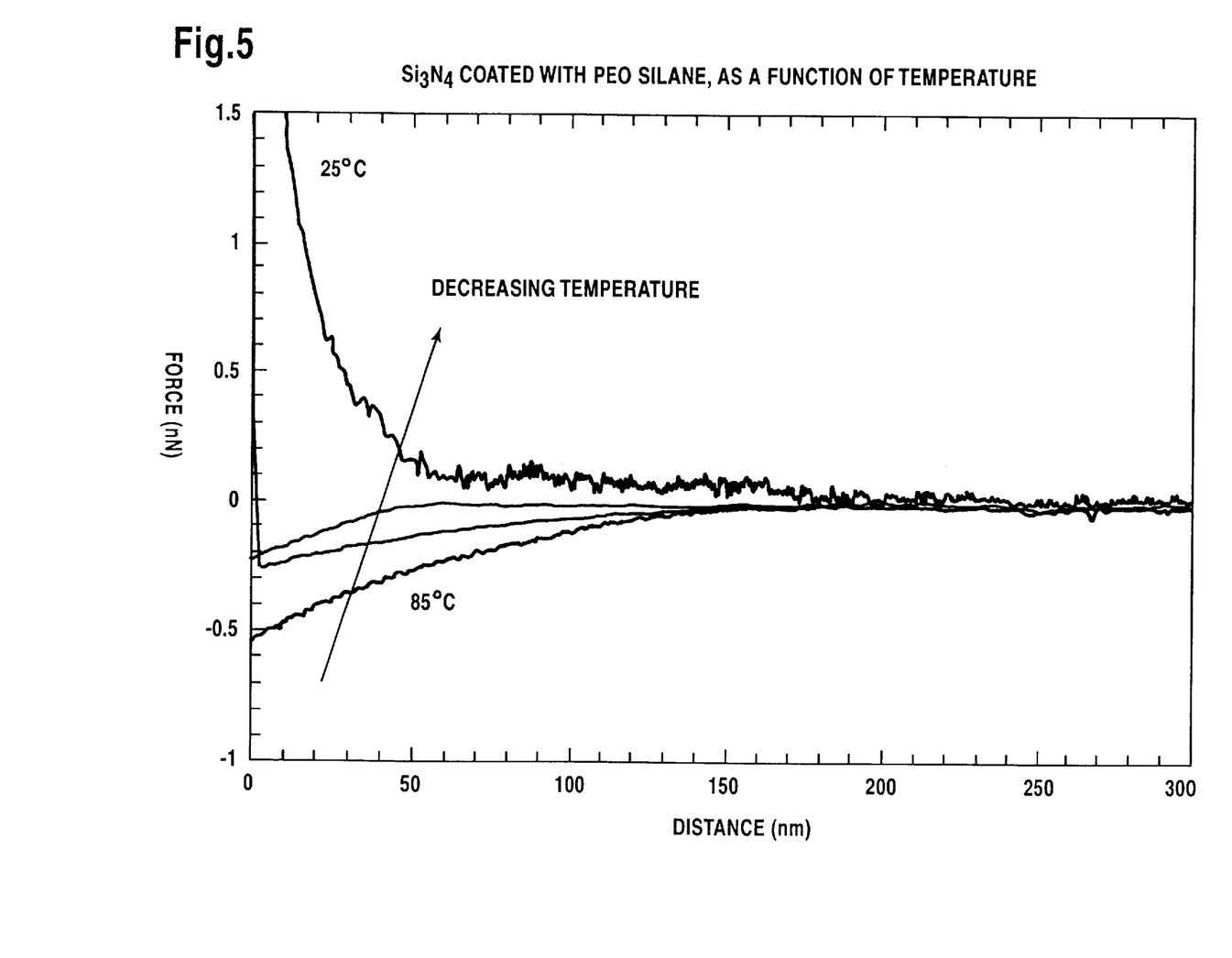
FIG. 5 Force-distance curves of $Si_3N_4$ powder coated with polyethylene-oxide silane, as a function of temperature.

FIG. 5 shows the force-distance curves—determined with the scanning force microscope—of $Si_3N_4$ coated with PEO silane. The measurements involved bringing a $Si_3N_4$ peak into contact with a flat $Si_3N_4$ layer and measuring the force between these two surfaces in water at pH 10. At 25° C., measurements showed all the forces to be repulsive, whereas at 85° C., strong attractive forces were measured. By raising the temperature, it is possible to obtain a reduction in repulsive forces and an increase in attractive forces.

The zeta-potential measurements and the force-distance curves clearly demonstrate the temperature-dependence of the charge on the pulverized particles, and the resulting forces acting between the particles. With the method of the invention, a reduction in repulsive forces acting between the particles is achieved, making homogeneous and rapid solidification of the dispersion possible.

The homogeneous conversion of repulsive into attractive forces increases the number of "very close neighbors" which the particles have, and this makes the molded article mechanically more stable.

Figure 6:
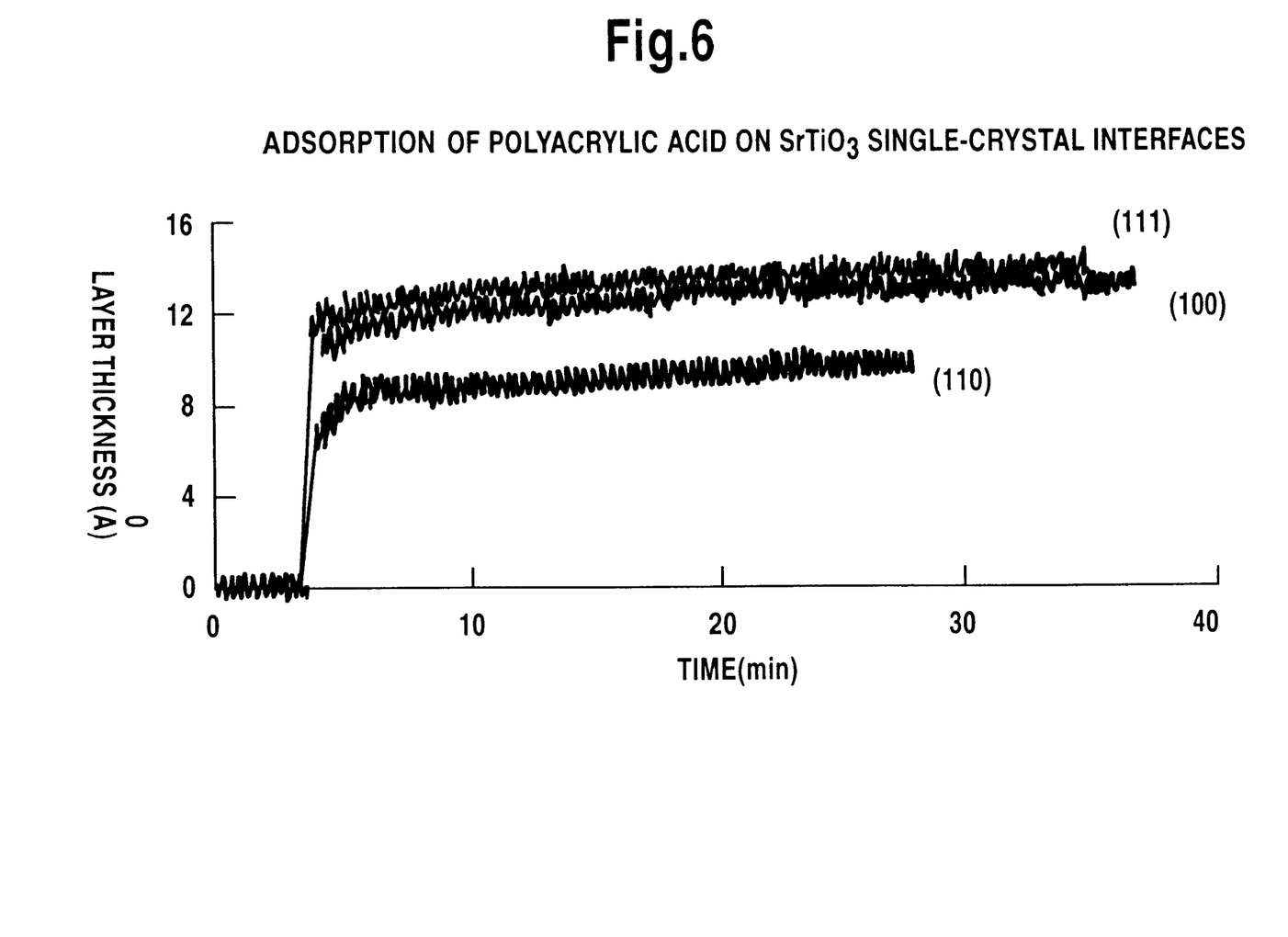
FIG. 6 shows an ellipsometric study of the adsorption of polyacrylic acid on $SrTiO_3$ single-crystal interfaces (100), (110) and (111). At the time $t_0$ a solution with polyacrylic acid was added.

Ellipsometric Study of the Adsorption of Polyacrylic Acid on $SrTiO_3$ Single-Crystal Interfaces FIG. 6 shows the differing degrees to which polyacrylic acid is adsorbed on $SrTiO_3$ surfaces 100, 110 and 111. The different amounts of polyacrylic acid adsorbed on the $SrTiO_3$ single-crystal interfaces results in different forces acting between two particles. By adjusting the temperature according to the method of the invention, the charges on the various interfaces, and thus the forces acting on them, can be adjusted such that certain interfaces attract or repel. In this way, it is possible to adjust the orientation and alignment of the particles, allowing the production of complex shapes of defined texture, and even of single crystals.

Molding

A slurry comprising 20 vol. % $Si_3N_4$ in water with 1.5% dispersant (PEO silane) was prepared and then centrifuged. The supernatent (water) was poured off. The resulting molding compound contains 40 vol. % $Si_3N_4$ with 1.5 % dispersant. The molding compound was poured into a non-porous, complex plastic mold and left for 5 minutes in an oven at 60° C. The elastic, green body of complex shape was then easily removed from the mold. The green molded article lost its elasticity during subsequent drying in air, but retained sufficient mechanical stability to allow problem-free further processing.

The green density was found to be 55 vol. %. The same density was determined for other $Si_3N_4$ volume contents in the starting dispersion.

When a slurry of $Si_3N_4$ with addition of 8% sintering additives was used, (4% $Al_2O_3$ and 4% $Y_2O_3$), the results were analogous to those for $Si_3N_4$.

EXAMPLE 2

In this example, α-aluminum oxide powder CS400 (Martinswerk, Germany) was used. In the preparation of this powder, citric acid is added during grinding. Due to the presence of residual citric acid (approximately $2.9 \times 10^{-4}$ wt. %), the powder's isoelectric point is at a pH of about 6.4. The normal isoelectric point of α-aluminum oxide, by contrast, is in the pH range from 8 to 9. A further shift in the isoelectric point (down to pH 3) was achieved by adding ammonium citrate (Fluka, Germany).

Aluminum oxide dispersions were prepared by introducing the desired amounts of powder, deionized water and maybe ammonium citrate into a ball mill, and then grinding for 30 minutes.

A Rheometric Dynamic Stress Rheometer (DSR-500) was used to determine viscosity as a function of the shear rate.

It was found that when the temperature was raised, eg, to 57° C., there was a significant increase in viscosity, combined with a pH change. When the pH reached the isoelectric point, a green body with excellent mechanical properties, eg, strength, was obtained.

What is claimed is:

1. A method for producing a solid molded article made of pulverized particles comprising the steps:
   (a) preparing a dispersion of pulverized particles in an aqueous fluid medium, the particles exhibiting a temperature—dependent charge state;
   (b) optionally filtering the dispersion to remove impurities;
   (c) transferring the dispersion to a mold;
   (d) supplying heat to solidify the molding compound in the mold by lowering the charge on the particles in the dispersion;
   (e) optionally demolding the solidified body, and
   (f) optionally drying the body.

2. The method of claim 1, wherein a dispersant is used with which a repulsive potential is established at the surface.

3. A method according to claim 1, wherein the dispersant is 0.2 to 10 nm in size.

4. A method according to claim 1, wherein the dispersant exhibits temperature-dependent solubility properties.

5. The method of claim 4, wherein a dispersant is used which has the general formula (I):

$$A\text{—}R \qquad (I)$$

where
   A stands for one or more anchoring groups which are capable of attaching to the surface of the particles, and
   R stands for one or more stabilizing groups characterized by temperature-dependent solubility in an aqueous medium.

6. The method of claim 5, wherein
   A is a group selected from —OH, —I, $SO_3H$, —$PO_3H_2$, tosylate, epoxide, and a silicon-containing group.

7. A method according to claim 1, wherein
   pulverized ceramic and/or metallic particles are used.

8. A method according to claim 1, wherein
   the dispersant is used in a proportion of 0.0001 to 5 wt. %, expressed in terms of the weight of pulverized particles.

9. The method of claim 8, wherein
   the dispersant is used in a proportion of 0.001 to 2.5 wt. %.

10. A method according to claim 1, wherein
    a dispersion is prepared which, in addition, contains at least one dissolved inorganic adhesion promoter, this being precipitated during solidification and/or drying.

11. A method according to claim 1, wherein
    in step (c), the molding compound is transferred to a mold by pouring.

12. A method according to claim 1, wherein
    a non-porous mold is used in step (c).

13. A method according to claim 1, wherein,
    in step (d), the viscosity of the dispersion is raised by a factor of at least $10^3$ during heating.

14. A method according to claim 1, wherein,
    in step (d), heating results in a temperature increase of 20 to 95° C.

15. A method according to claim 1, also comprising a sintering step.

16. The method of claim 15, wherein
    the sintering step is conducted without previous burnout.

17. Crystallographically oriented, anisotropic polycrystalline molded article obtained by a method according to claim 15.

18. A solid molded article made of pulverized particles and obtained by a method according to claim 1, wherein
    said article consists of particles to the surface of which a dispersant is attached, which exhibits temperature-dependent solubility properties in an aqueous medium.

19. The molded article of claim 18, wherein
the particles exhibit a mean diameter of <2 μm.

20. A molded article according to claim 18, wherein
said article has a density of 40 to 70 vol. %, expressed in terms of the theoretically achievable density.

21. A molded article made of pulverized particles and obtained by a method according to one of claim 1, wherein
said article exhibits crystallographically oriented, anisotropic polycrystalline areas.

22. The molded article of claim 21, wherein it has an anisotropic texture.

23. A method for producing a solid molded article made of pulverized particles comprising the steps:
(a) preparing a dispersion of pulverized particles in an aqueous fluid medium, the particles exhibiting a temperature—dependent charge state;
(b) optionally filtering the dispersion to remove impurities;
(c) transferring the dispersion to a mold;
(d) supplying heat to solidify the molding compound in the mold;
(e) optionally demolding the solidified body, and
(f) optionally drying the body;
wherein shear forces are used to assist in preparation of the dispersion in step (a).

24. A method for producing a solid molded article made of pulverized particles comprising the steps:
(a) preparing a dispersion of pulverized particles in an aqueous fluid medium, the particles exhibiting a temperature—dependent charge state;
(b) optionally filtering the dispersion to remove impurities;
(c) transferring the dispersion to a mold;
(d) supplying heat to solidify the molding compound in the mold;
(e) optionally demolding the solidified body, and
(f) optionally drying the body;
wherein A is a silicon-containing group, and the dispersant used has the general formula (II):

$$SiXYZ—R \qquad (II)$$

where
R stands for one or more stabilizing groups characterized by temperature—dependent solubility in an aqueous medium,
X, Y and Z are substituents on Si, which is preferably selected independently from: H, halogen, OH, $OR^1$.

25. The method of claim 24, wherein
R is a group comprising at least 2 $C_2$–$C_4$ alkylene oxide units.

26. The method of claim 25, wherein
R comprises at least two ethylene oxide and/or propylene oxide units.

27. A method according to claim 24, wherein
R additionally comprises at least one Brönsted acid and/or Brönsted base group.

28. The method of claim 27, wherein
the acid and/or base groups are selected from $—NR^2—$, $—NR^2—CO—$, $—N(R^2)_2$, $—CO—N(R^2)_2—$ and $COOR^3$ groups, where $R^2$ stands for H or an alkyl, alkenyl or alkinyl radical, which may be substituted, and $R^3$ stands for H or a metal or ammonium cation.

29. A method for producing a solid molded article made of pulverized particles comprising the steps:
(a) preparing a dispersion of pulverized particles in an aqueous fluid medium, the particles exhibiting a temperature—dependent charge state;
(b) optionally filtering the dispersion to remove impurities;
(c) transferring the dispersion to a mold;
(d) supplying heat to solidify the molding compound in the mold;
(e) optionally demolding the solidified body, and
(f) optionally drying the body;
wherein anistropic pulverized particles are used in step (a).

30. A method for producing a solid molded article made of pulverized particles comprising the steps:
(a) preparing a dispersion of pulverized particles in an aqueous fluid medium, the particles exhibiting a temperature—dependent charge state;
(b) optionally filtering the dispersion to remove impurities;
(c) transferring the dispersion to a mold;
(d) supplying heat to solidify the molding compound in the mold;
(e) optionally demolding the solidified body, and
(f) optionally drying the body;
wherein, in step (b), impurities with a mean diameter of >2 μm are removed.

31. A dispersion of pulverized particles in an aqueous fluid medium, wherein
said dispersion contains 0.0001 to 5 wt. % dispersant, expressed in terms of the weight of the pulverized particles, which is attached to the surface of the particles and exhibits temperature-dependent solubility properties.

32. The dispersion of claim 31, wherein
the particles exhibit a mean diameter of <2 μm.

33. The dispersion of claim 31, wherein
it also contains at least one dissolved inorganic adhesion promoter.

* * * * *